United States Patent [19]

Inchley

[11] Patent Number: 5,456,899
[45] Date of Patent: Oct. 10, 1995

[54] PREPARATION OF TITANIUM DIOXIDE

[75] Inventor: Paul Inchley, Newton Aycliffe, England

[73] Assignee: Tioxide Specialties Limited, London

[21] Appl. No.: 191,917

[22] Filed: Feb. 4, 1994

[30] Foreign Application Priority Data

Feb. 10, 1993 [GB] United Kingdom ............ 9302559

[51] Int. Cl.$^6$ .................................. C01G 23/04
[52] U.S. Cl. .......................... 423/611; 423/612
[58] Field of Search ............ 423/611, 612, 423/84

[56] References Cited

U.S. PATENT DOCUMENTS

| 2,290,922 | 7/1942 | Verduin | 423/612 |
|---|---|---|---|
| 3,528,773 | 12/1967 | Surls et al. | 423/611 |
| 4,612,138 | 9/1986 | Keiser | 252/313.2 |
| 4,803,064 | 2/1989 | Montino et al. | 423/612 |
| 4,923,682 | 5/1990 | Roberts et al. | 423/611 |
| 4,944,936 | 7/1990 | Lawhorne | 423/612 |
| 5,149,519 | 9/1992 | Chopin et al. | 423/611 |

FOREIGN PATENT DOCUMENTS

| 0260664 | 9/1987 | European Pat. Off. | |
|---|---|---|---|
| 0335773 | 10/1989 | European Pat. Off. | 423/611 |
| 2430394 | 3/1980 | France . | |
| 53-026809 | 3/1978 | Japan . | |
| 54-010300 | 1/1979 | Japan . | |
| 63-008218 | 1/1988 | Japan . | |
| 4280815 | 6/1992 | Japan . | |
| 5286738 | 11/1993 | Japan . | |
| 1240343 | 6/1986 | U.S.S.R. | 423/210 |
| 0454324 | 9/1936 | United Kingdom . | |
| 0481892 | 3/1938 | United Kingdom . | |
| 0497694 | 12/1938 | United Kingdom . | |
| 0513867 | 10/1939 | United Kingdom . | |
| 0536141 | 5/1941 | United Kingdom . | |
| 0576588 | 4/1946 | United Kingdom . | |
| 1023275 | 3/1966 | United Kingdom . | |

OTHER PUBLICATIONS

Basic Principles of Organic Chemistry, 2nd ed., 1977, no month, W. A. Benjamin, Inc., p. 791.
Perry's Chemical Engineers' Handbook, 4th ed., 1973, no month, pp. 20–60.

Primary Examiner—Steven Bos
Attorney, Agent, or Firm—Baker & Botts

[57] ABSTRACT

A novel process for preparing titanium dioxide from a titanium chloride consists of heating an aqueous solution of the titanium chloride in the presence of a salt of a polycarboxylic acid. The process is useful for producing titanium dioxide having a particle size between 0.1 and 1 micrometer and a purity which is suitable for more demanding electroceramic applications.

14 Claims, No Drawings

PREPARATION OF TITANIUM DIOXIDE

This patent relates to a process for the preparation of titanium dioxide and in particular to a process for the conversion of a titanium chloride to titanium dioxide by hydrolysis in aqueous solution.

Titanium dioxide is a useful material for the preparation of electroceramic materials such as barium titanate and lead zirconate titanate. It is desirable for the preparation of these electroceramic materials to use titanium dioxide with a high level of purity and a controlled particle size.

High purity titanium dioxide powders are known but, generally, the average particle size of available powders is either substantially less than 0.1 micrometer or substantially greater than 1 micrometer. Titanium dioxide pigments having an average particle size generally within the range 0.1 to 1 micrometer are well known but, generally, these powders are not sufficiently pure for electroceramic applications since additives are normally used to control the particle size.

Hydrolysis of aqueous solutions of titanium chlorides to form particulate titanium dioxide is well known but the process has not hitherto been employed for the preparation of titanium dioxide having the controlled particle size and purity required for the more demanding electroceramic applications.

According to the invention a process for the preparation of titanium dioxide comprises heating an aqueous solution of a titanium chloride in the presence of a salt of a polymeric carboxylic acid.

Surprisingly, this process results in a form of titanium dioxide in which any aggregates present are readily broken down to produce a powder having an average particle size between 0.1 and 1 micrometer.

The process utilises an aqueous solution of a titanium chloride. This can be prepared in any convenient manner but typically, it is formed by dilution of anhydrous titanium tetrachloride with water or hydrochloric acid.

The concentration of the titanium chloride solution can vary widely and depends, to some extent, on the amount of hydrochloric acid, if any, used. Generally, the concentration will be equivalent to from 100 to 500 grams of $TiO_2$ per liter and, preferably, the concentration is equivalent to from 300 to 500 grams of $TiO_2$ per liter.

The hydrolysis of the titanium chloride is brought about by heating in the presence of a salt of a polymeric carboxylic acid. Suitable salts include ammonium or alkali metal salts of polycarboxylic acids such as sodium polyacrylate, ammonium polyacrylate and sodium carboxymethyl cellulose.

The concentration of the salt of a polycarboxylic acid which has been found useful depends to some extent upon the nature of the salt. Quantities as low as 0.01 per cent by weight with respect to the titanium content of the titanium chloride solution expressed as $TiO_2$ have proved useful and generally it is not necessary to employ quantities above 5 per cent by weight with respect to weight of $TiO_2$. Preferably, the concentration of the salt of a polycarboxylic acid is from 0.05 to 2 per cent by weight with respect to the titanium content of the titanium chloride solution expressed as $TiO_2$.

The hydrolysis is induced by heating the solution of titanium chloride. Usually the solution is heated to a temperature of at least 80° C. and, preferably, it is heated to a temperature of between 100° C. and 110° C.

The hydrolysis can be induced by the step of raising the temperature of a solution of a titanium chloride which contains the salt of a polymeric carboxylic acid but the titanium chloride solution is preferably slowly added to heated water or a heated solution of the salt of a polymeric carboxylic acid.

The temperature of the solution is maintained at this elevated temperature, normally with agitation, for sufficient time to convert substantially all the titanium chloride to titanium dioxide. Typically the solution is heated for a period of from 3 to 5 hours.

Once hydrolysis is complete, the precipitated titanium dioxide can be separated from the aqueous mother liquors by filtration on a vacuum filter, pressure filter, centrifuge or other suitable equipment. Generally, the solids are washed to remove acid and subsequently dried. Drying is accomplished at a temperature usually from 200° C. to 1000° C. Below 200° C. it is generally difficult to ensure complete removal of water from the titanium dioxide and above 1000° C. any aggregates present tend to sinter to form large particles which are difficult to break down. Preferably the separated powder is dried at a temperature between 600° C. and 900° C.

Alternatively, the titanium dioxide may be separated and dried simultaneously by subjecting the slurry formed by hydrolysis to spray-drying or the precipitated slurry may be used as the feed for further processing into mixtures suitable for forming ceramics.

Generally, the product of the process of the invention contains a relatively low proportion of aggregated particles and any aggregates which are present can be easily broken down by, for example, ball-milling or sand milling.

The particulate titanium dioxide formed is eminently suitable for the formation of electroceramic materials and generally has an average particle size between 0.1 and 1 micrometer.

The process enables the production of titanium dioxide having a very high purity by selection of suitably pure starting materials and control of the process conditions. Specifically, it has been found possible to obtain titanium dioxide containing less than 0.1 per cent by weight impurities by using the process of the invention. In particular, the process allows the formation of titanium dioxide containing less than 0.025 per cent by weight in total of the following elements: aluminium, silicon, phosphorus, iron, chromium, nickel, vanadium, sodium, calcium, potassium, antimony, niobium, tin, lead, zinc and zirconium and less than 0.05 per cent by weight in total of sulphur and chlorine.

The invention is illustrated by the following examples.

EXAMPLE 1

0.17 g of Blanose, a high molecular weight sodium salt of carboxymethyl cellulose sold by Aqualon (UK) Ltd, was dissolved in 235 g of water and heated to boiling in a reflux apparatus. 1265 g of a solution of titanium chloride in hydrochloric acid containing 340 g of titanium expressed as titanium dioxide and 445 g of acid expressed as hydrogen chloride was added over 35 minutes and the resulting slurry heated at reflux for a further three hours. The mixture was cooled and filtered on a Buchner funnel to remove the mother liquor, and the resulting hydrated titanium dioxide heated at 820° C. for 5 hours in a static kiln. The product, a soft white powder, was sieved through a 212 micrometer mesh.

The powder contained the following impurities (ppm= parts per million by weight):

| Al | <10 ppm | K  | <8 ppm |
|----|---------|----|--------|
| Si | 46 ppm  | Sb | <8 ppm |
| P  | <20 ppm | Nb | 8 ppm  |

-continued

| | | | |
|---|---|---|---|
| Fe | <1 ppm | Sn | <10 ppm |
| Cr | <1 ppm | Pb | <10 ppm |
| Ni | <1 ppm | S | 120 ppm |
| V | <1 ppm | Cl | <10 ppm |
| Na | 25 ppm | Zn | <8 ppm |
| Ca | 50 ppm | Zr | 15 ppm |

A sample of the product was made up into an aqueous slurry containing 40% solids and ball-milled for 24 hours. Analysis by sedimentation of the particle size distribution after ball-milling showed a median particle size of 0.89 micrometer.

EXAMPLE 2

4.1 g of DISPEX A40, a high molecular weight ammonium polycarboxylate salt sold by Allied Colloids Ltd, was dissolved in 280 g of water and heated to boiling as in Example 1. 1500 g of a solution of titanium chloride in hydrochloric acid containing 410 g of titanium expressed as titanium dioxide and 540 g of acid expressed as hydrogen chloride was added over 40 minutes and the resulting slurry heated at reflux for a further 3 hours. The mixture was cooled and filtered on a Buchner funnel to remove the mother liquor, and the resulting hydrated titanium dioxide calcined at 600° C. for 5 hours in a static kiln. The product, a soft white powder, was sieved through a 212 micrometer mesh.

The powder contained the following impurities:

| | | | |
|---|---|---|---|
| Al | <10 ppm | K | <8 ppm |
| Si | 28 ppm | Sb | <8 ppm |
| P | <20 ppm | Nb | 8 ppm |
| Fe | <1 ppm | Sn | 10 ppm |
| Cr | <1 ppm | Pb | <10 ppm |
| Ni | <1 ppm | S | 80 ppm |
| V | <1 ppm | Cl | 870 ppm |
| Na | <5 ppm | Zn | 8 ppm |
| Ca | 28 ppm | Zr | 15 ppm |

After ball-milling as in Example 1, the particle size distribution of a sample of the product was analysed and showed a median particle size of 0.33 micrometer.

What is claimed is:

1. A process for the preparation of titanium dioxide powder comprising heating an aqueous solution of a titanium chloride in the presence of a salt of a polymeric carboxylic acid to precipitate titanium dioxide, wherein said salt is present at a concentration between about 0.01 and 2.0 percent, by weight, with respect to the titanium content of the solution expressed as $TiO_2$ and then drying the titanium dioxide precipitate to form the titanium dioxide powder.

2. A process according to claim 1 in which the salt of a polymeric carboxylic acid is selected from the group consisting of ammonium salts and alkali metal salts.

3. A process according to claim 1 in which the salt of a polymeric carboxylic acid is selected from the group consisting of sodium polyacrylate, ammonium polyacrylate and sodium carboxymethyl cellulose.

4. A process according to claim 1 in which the titanium chloride solution has a concentration equivalent to between 100 and 500 grams $TiO_2$ per liter of solution.

5. A process according to claim 4 in which the concentration is from 300 to 500 grams $TiO_2$ per liter of solution.

6. A process according to claim 1 in which the salt of a polymeric carboxylic acid is present in the titanium chloride solution at a concentration between 0.05 and 2.0 per cent by weight with respect to the titanium content of the solution expressed as $TiO_2$.

7. A process according to claim 1 in which the solution of titanium chloride is heated to a temperature of at least 80° C.

8. A process according to claim 7 in which the temperature is between 100° C. and 110° C.

9. A process according to claim 1 in which the solution of titanium chloride is slowly added to heated water.

10. A process according to claim 9 in which the salt of a polymeric carboxylic acid is dissolved in the heated water.

11. A process according to claim 1 in which the solution of titanium chloride is heated for from 3 to 5 hours.

12. A process according to claim I in which the titanium dioxide is separated from the aqueous solution and dried at a temperature between 200° C. and 1000° C.

13. A process according to claim 12 in which the temperature is between 600° C. and 900° C.

14. A process according to claim 1 in which the titanium dioxide is simultaneously separated and dried by subjecting the slurry which is produced by heating the titanium chloride solution to spray-drying.

* * * * *